Oct. 25, 1966 N. W. SEAQUIST 3,281,021

LEVER ACTUATOR AND CAP FOR AEROSOL VALVES

Filed Oct. 19, 1964

INVENTOR.
Nels W. Seaquist

BY Dominik & Stein

Attorneys

United States Patent Office 3,281,021
Patented Oct. 25, 1966

3,281,021
LEVER ACTUATOR AND CAP FOR AEROSOL VALVES

Nels W. Seaquist, Crystal Lake, Ill., assignor to Seaquist Valve Company, a division of Pittsburgh Railways, Cary, Ill., a corporation of Pennsylvania
Filed Oct. 19, 1964, Ser. No. 404,897
15 Claims. (Cl. 222—182)

This invention relates to an actuator for an aerosol valve, and more particularly, to an actuator having a unique lever action whereby actuating force for the valve upon which the actuator is mounted is substantially minimized. Still more particularly, to an actuator of this type having a unique mounting arrangement of the activating lever with the remainder of the actuator so that the activating lever is freely, but securely, retained therein.

This application is a continuation-in-part of copending application Serial No. 384,452, filed July 22, 1964, now abandoned.

Aerosol valves generally utilize a spring biased hollow or solid valve stem which extends upwardly out of the valve. This stem must be depressed to cause release of the pressurized product within the can. In the hollow stem type valve, the released product travels through an orifice in the wall of the stem and out through its top. In the solid stem type valve, the released product travels up between the stem and the upwardly extending discharge tube. The actuator is fixed to the valve stem or to the discharge tube.

To properly seal the valve stem, a spring is generally employed under the stem. It supplements the sealing force generated by the pressurized gas within the container against the bottom of the valve. The force of this spring and the pressurized gas is generally quite substantial. It usually requires a greater force to upset the seal, whereby the product can be released.

Many dispensing heads or actuators for aerosol valves have been devised, but in most instances, they are difficult to operate because of the extra actuating force needed to operate the actuator. Women frequently complain that the valve of the aerosol can is too stiff and that it is difficult to actuate. Because of this, the discharge is messy or misdirected. Such complaint obviously retards sale of any product sold as an aerosol.

The trade continues to tackle solutions to this complaint by resort to various devices and schemes, but none have been too satisfactory. For example, it resorted to a diaphragm actuator. Then, as seen in U.S. Re. 24,555, a tab structure integral with the dispensing spout was devised to overcome the "not entirely satisfactory" operation of a diaphragm valve. But even this alleged improvement was not entirely satisfactory, for U.S. 2,975,943 and U.S. 3,066,838 proposed levers for use with the tab actuator. However, such levers necessitate a two-piece actuator which is not too desirable. The trade continues to seek a structure which requires minimum actuating force, with the benefit of lever action and which permits the molding of the desired one-piece actuator.

An object of this invention is to provide a novel dispensing head or actuator.

A further object is to provide an actuator which requires an extremely minimal actuating force.

A still further object is to provide an actuator which possesses the benefits of a lever action to upset the seal of the aerosol valve.

Another object is to provide an actuator having an initial one-piece construction to facilitate its mounting upon a valve.

Another object is to provide an actuator which, although of two parts, has a structure wherein loss of one of the parts is not possible.

Another object is to provide a structure for an actuator which enables minimal variation in design to permit vertical, horizontal, or in-between angular spray patterns.

Another object is to provide an actuator structure which has pilferage detection means.

Another object is to provide an actuator which is pleasing to the eye so that sale of the product in the aerosol can to which it is affixed is stimulated.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

The actuator of this invention, in its broadest aspects, comprises an outer tubular mounting structure surrounding a fingerpiece which is levered upon said outer structure. There is no intended connection between the fingerpiece and the outer structure, and the fingerpiece pivots about a lever point upon the valve stem or discharge tube of the valve upon which the actuator is affixed and within apertures formed therein. Only the force of the valve closing means of the valve, diminished by the leverage attained by the lever structure, is required to upset the valve and therefore, only minimal actuating force is necessary to cause discharge of the contents of the aerosol can.

More particularly, the actuator of this invention comprises an outer tube which may be secured to the aerosol valve housing rim or to the outer lip of the aerosol can. A fingerpiece with a forwardly extending lever tab is freely retained within slots formed in the outer tube and pivots about a lever support surface on said other tube. The fingerpiece contains a discharge passageway which affixes to the valve discharge means. The upper end of the discharge passageway acts as the discharge orifice of the actuator. It may be vertically, horizontally or angularly disposed therebetween.

For a fuller understanding of the nature and objects of the invention, reference should be had to the following detailed description taken in connection with the accompanying drawings in which.

Similar reference characters refer to similar parts throughout the several views of the drawings.

Figure 1:
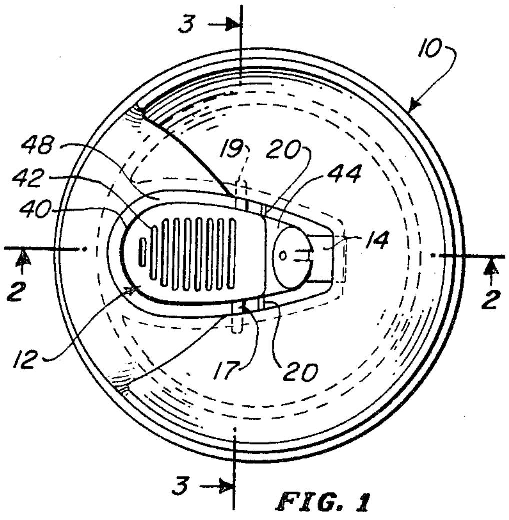
FIGURE 1 is a top view of an embodiment of an actuator of this invention.

As seen in FIGS. 1 to 6, the actuator has a basic structure which comprises an upright tubular support wall 10 and a fingerpiece 12 having a lever tab 14 extending forwardly therefrom which is freely secured in a slot 15 and arranged to pivot upon a lever pivot support surface 16 on the tubular support wall 10. The fingerpiece 12 also has a pair of retaining tabs 17 and 19 extending outwardly in a transverse fashion therefrom which are freely secured within enlarged slots 21 and 23, respectively. These tabs, as will be explained more fully hereinafter, secure the fingerpiece 12 within the actuator to prevent it from being displaced, or from being lost.

The wall 10 may have varying configurations, including the double wall configuration shown as well as a singular wall which may be secured to the valve housing or to the rim of the can. Such variation in wall structure will be evident as the description of the actuator proceeds.

With respect to the wall-fingerpiece interconnection, it is preferred that both be molded as a one-piece article. Lever web 18 may connect the wall and the fingerpiece when first molded; however, the web, during use, is severed and accordingly, the wall and the fingerpiece act as two separate parts. Fingerpiece sprue 20 enables such molding of the wall 10 and fingerpiece 12 as a one-piece article. The sprue may be utilized, if desired, as a pilferage or prior use indicator, as will be described in greater detail hereinafter.

Figure 2:
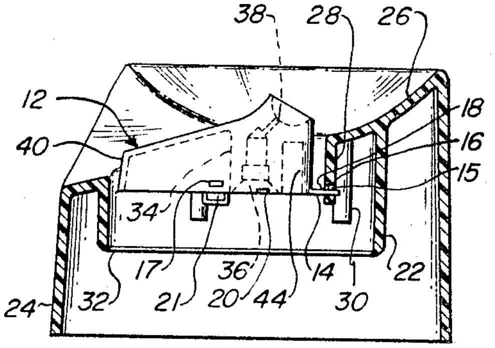
FIGURE 2 is a cross-sectional view of the actuator of FIG. 1 taken along line 2—2.
Figure 3:
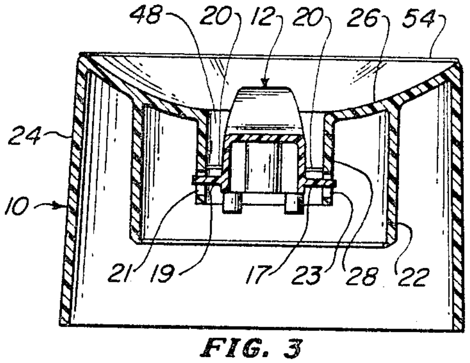
FIGURE 3 is another cross-sectional view of the actuator of FIG. 1 taken along line 3—3.
Figure 6:
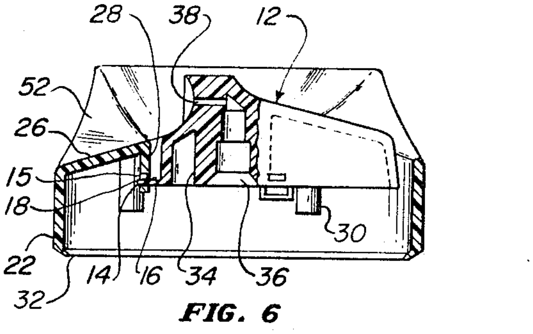
FIGURE 6 is a sectional view of a second embodiment of the actuator of this invention, for valve affixation only.

Referring back to the tubular support wall 10, it is either a double wall structure consisting of an inner wall 22 and an outer wall 24 with a bridge 26 connecting the upper end of both walls, as seen in FIG. 2 or a mere inner wall 22 which affixes to the valve housing, as seen in FIG. 6. The bridge of FIG. 2 is also preferably angled further upwardly to enable easy stacking and support of a plurality of aerosol cans or containers one upon the other.

The slots 15, 21 and 23 and the lever pivot support surface 16 are provided by constructing a third inner wall 28 which is preferably arcuate in shape to form a wall therein for the fingerpiece which will be described in detail hereinafter. The upper edge of the slot 15 in the inner wall 28, in the preferred embodiment of this invention, acts as the lever pivot support surface 16.

If desired, vertical ribs 30 may be formed on the inner wall 22 to provide added strength to the wall. These terminate short of the lower edge of the inner wall and act as stops against the upper surface of the valve housing. Inwardly slanted annular anchor lip 32 on the bottom edge of the inner wall 22 provides a snap-fit arrangement whereby the actuator can be easily secured to the valve housing. It should be evident that an equivalent anchoring means, such as a channeled bottom edge with an anchoring lip on the bottom edge of the outer wall 24, could also be utilized.

It should be particularly noted that the outer wall 24 and bridge 26 could be eliminated if desired as in FIG. 6, but this is less attractive in overall appearance when mounted on a can.

Figure 4:
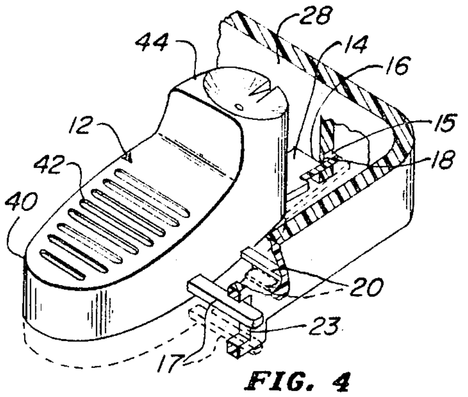
FIGURE 4 is a partial detailed perspective view of the fingerpiece, the lever tab and a portion of the outer tube of the actuator of FIG. 1, in detail, to illustrate the unique lever action thereof.
Figure 5:
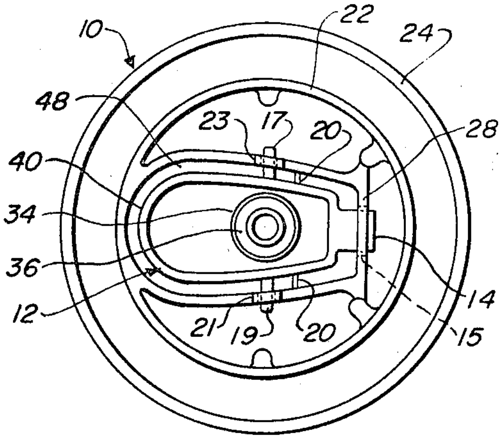
FIGURE 5 is a bottom view of the actuator of FIG. 1.

Now, with respect to the structure of the fingerpiece and its lever action, via lever tab 14 and the retaining tabs 17 and 19 acting on the third inner wall 28, FIG. 4 illustrates this action most dramatically. As seen therein, and in FIG. 2, the fingerpiece 12 comprises an oval-shaped inverted cup structure. If desired, a solid block structure could be utilized, but the hollow inverted cup structure is preferred because it saves material and lightens the weight of the fingerpiece.

Situated within, and substantially centrally of the cavity of the inverted cup structure of fingerpiece 12, is a discharge tube 34. The lower end of the tube has a flare 36 which facilitates affixation of the actuator to the outer valve stem or discharge tube of the aerosol valve. The upper end of the discharge tube 34 narrows down to a discharge orifice 38. This orifice provides the spray pattern characteristic of the actuator. As seen in FIG. 2, it may be angularly disposed or, as seen in FIG. 6, it may be horizontally disposed. One may also utilize a vertically disposed discharge orifice 38 so that a vertical spray pattern will be effected. It should be evident that the exact angular positioning of the discharge orifice is within the dictates of the user of the actuator of this invention.

Referring back to the structure of the fingerpiece, its heel portion 40 comprises the finger engaging surface for the user of the can. Knurls 42 provide a slip-free surface. The toe 44 contains the lever tab 14 which extends forwardly therefrom, as best seen in FIGS. 2 and 4. The tab is actually integral with the toe 44 of the fingerpiece. The extreme forward portion of the tab 14 is freely secured within the slot 15 formed in the inner wall 28 and is arranged to pivot about support surface 16 so that substantial leverage can be obtained. Thus, with only slight actuating force, the aerosol valve can be upset to enable discharge of the contents of the aerosol can. Also, the fingerpiece 12 is retained in well 48 (see FIG. 1) by the use of retaining tabs 17 and 19 (see FIGS. 1 and 3) which are freely secured within the slots 21 and 23 so that the retaining tabs 17 and 19 are free to move up and down within the enlarged slots. Although two are shown, one or three or more may be utilized merely by providing additional slots in the inner wall 28. The two retaining tabs shown, along with lever tab 14, therefore, provide a three-point locking means for the fingerpiece within well 48.

As seen in FIG. 6, the discharge orifice 38 may be positioned horizontally. In such event, the tubular support wall 10 is depressed immediately in front of the discharge orifice so that a horizontal dispensing of product may occur. This depression 52 may constitute a part of the continuous annular bridge 26 which connects the inner and outer walls 22 and 24, respectively, of the support wall 10 and the third wall 28.

If desired, an overlying sheet 54 may be heat sealed to the top edge of the bridge or else a shrink sleeve may be shrunk upon the entire actuator to provide even further protection against pilferage, or to provide a sanitary atmosphere about the dispensing orifice.

In molding the actuator of this invention, a one-piece technique is utilized. Such a technique is accomplished by the use of fingerpiece sprues 20 (see FIGS. 1, 3, 4 and 5) at each side of the fingerpiece. Generally, the gate for the mold cavity communicates with the tubular support wall 10 anywhere at its periphery, usually at the lower edge. Also, the mold cavity is appropriately formed to provide the slots 15, 21 and 23 about the lever tab 14 and the retaining tabs 17 and 19. Injection molded material, generally polyethylene, polypropylene, ethyl cellulose, polyvinyl chloride, polyvinylidene chloride and the like, spews through said gate and into the cavity to form the tubular support wall. Then it travels through fingerpiece sprues 20 into the cavity forming the fingerpiece. The sprue connection between the fingerpiece and the tubular support wall remains such as indicated in FIG. 4. Upon first use or depression of the fingerpiece to actuate the valve, upon which the actuator is mounted, sprues 20 are broken, such as illustrated by the dotted lines 46 in FIG. 4. By properly dimensioning the sprues, it is possible to use them as pilferage detection means whereby a purchaser of the aerosol can may easily determine any prior use of or tampering with the can or its contents.

With respect to lever web 18 and lever tab 14, some flashing between them may be encountered. However, since it is extremely thin, it almost immediately severs upon first use of the actuator, and a pivot action without connection of the tab 14 on the lever pivot support surface 16 merely occurs. The fingerpiece 12 is therefore normally secured to the body portion of the actuator, either by the sprue connection or by the action of the lever tab 14 and the retaining tabs 21 and 23.

It will thus be seen that the objects of this invention, set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. An actuator for an aerosol valve which comprises an outer tubular wall structure capable of being mounted upon the aerosol valve, said structure having a downwardly facing lever support surface concealed within the interior of the outer tubular wall structure, and a fingerpiece with a forwardly extending lever tab which extends beneath said surface and pivots about said support surface, whereby said valve may be opened with minimum actuating force, said fingerpiece having a discharge passage therein with means to connect said passage to the discharge means of said aerosol valve.

2. An actuator for an aerosol valve which comprises a vertically disposed outer tubular wall structure having an outer wall and an inner wall substantially concentric thereto with an annular bridge connecting said outward and inner walls, said inner wall having means on its lower end for affixation to said aerosol valve, said structure having a lever support surface and a horizontally disposed fingerpiece with a forwardly extending lever tab which pivots about said support surface, whereby said valve may be opened with minimum actuating force, said fingerpiece having a discharge passage therein with means on its lower end to connect said passage to the discharge means of said aerosol valve and orifice means on its upper end to provide a desired spray pattern.

3. An actuator for an aerosol valve which comprises an outer tubular wall structure capable of being mounted upon the aerosol valve, said structure having a lever support and retaining aperture and a plurality of retaining apertures formed therein and a fingerpiece with a forwardly extending lever tab which is freely supported and retained within said lever support and retaining aperture and a plurality of retaining tabs each of which is freely supported within one of said retaining apertures, whereby said fingerpiece is freely secured within said wall structure and said valve may be opened with minimum actuating force, said fingerpiece having a discharge passage therein with means to connect said passage to the discharge means of said aerosol valve.

4. An actuator for an aerosol valve which comprises a vertically disposed outer tubular wall structure with means on its lower end for affixation to said aerosol valve, said structure having a lever support and retaining aperture and a plurality of retaining apertures formed therein and a horizontally disposed fingerpiece with a forwardly extending lever tab which is freely supported and retained within said lever support and retaining aperture and a plurality of retaining tabs, each of which is freely supported within one of said retaining apertures, whereby said fingerpiece is freely secured within said wall structure and said valve may be opened with minimum actuating force, said fingerpiece having a vertically disposed discharge passage therein with means on its lower end to connect said passage to the discharge means of said aerosol valve and orifice means on its upper end to provide a desired spray pattern.

5. The actuator of claim 4 wherein said orifice means is horizontally disposed to effect a horizontal spray pattern.

6. The actuator of claim 4 wherein said orifice means is angularly disposed to effect an angular spray pattern.

7. An actuator for an aerosol valve which comprises a vertically disposed outer tubular wall structure having an outer wall and an inner wall substantially concentric thereto with an annular bridge connecting said outward and inner walls, said inner wall having means on its lower end for affixation to said aerosol valve, said structure having a lever support and retaining aperture and a plurality of retaining apertures formed therein and a horizontally disposed fingerpiece with a forwardly extending lever tab which is freely secured within said lever support and retaining aperture and a plurality of retaining tabs, each of which is freely secured within one of said retaining apertures whereby said fingerpiece is freely retained within said inner wall and said valve may be opened with minimum actuating force, said fingerpiece having a vertically disposed discharge passage therein with means on its lower end to connect said passage to the discharge means of said aerosol valve and orifice means on its upper end to provide a desired spray pattern.

8. An actuator for an aerosol valve which comprises a vertically disposed outer tubular wall structure having an outer wall and an inner wall substantially concentric thereto and a third wall inwardly of said inner wall with an annular bridge connecting the upper edges of all said walls, said inner wall having means on its lower end for affixation to said aerosol valve and said third wall having a lever support and retaining aperture and a pair of retaining apertures formed therein and a horizontally disposed fingerpiece with a forwardly extending lever tab which is freely supported and retained within said lever support and retaining aperture and a plurality of retaining tabs each of which is freely secured within one of said retaining apertures whereby said fingerpiece is freely secured within said wall structure and said valve may be opened with minimum actuating force, said fingerpiece having a vertically disposed discharge passage therein with means on its lower end to connect said passage to the discharge means of said aerosol valve and orifice means on its upper end to provide a desired spray pattern.

9. An actuator for an aerosol valve which comprises a vertically disposed outer tubular wall structure having an outer wall and an inner wall substantially concentric thereto and an arcuate third wall within said inner wall to form a fingerpiece well with an annular bridge connecting the upper edges of all said walls, said inner wall having means on its lower end for affixation to said aerosol valve and said arcuate third wall having a lever support and retaining aperture and a pair of retaining apertures formed therein on its lower edge and a horizontally disposed fingerpiece within said well with a forwardly extending lever tab which is freely supported and retained within said lever support and retaining aperture and a plurality of retaining tabs each of which is freely secured within one of said retaining apertures whereby said fingerpiece is freely secured within said wall structure and said valve may be opened with minimum actuating force, said fingerpiece having a vertically disposed discharge passage therein with means on its lower end to connect said passage to the discharge means of said aerosol valve and orifice means on its upper end to provide a desired spray pattern.

10. The actuator of claim 9 wherein the upper edge of said outer wall is above the upper edge of said inner wall and said third wall and said annular bridge slants upwardly from said third wall to said outer wall to enable stacking of a plurality of aerosol cans one upon the other.

11. An actuator for an aerosol valve which comprises a vertically disposed outer tubular wall structure having an outer wall and an inner wall substantially concentric thereto and a third wall inwardly of said inner wall with an annular bridge connecting the upper edges of all said walls, said inner wall having means on its lower end for affixation to said aerosol valve and said third wall having a lever support and retaining aperture and a plurality of retaining apertures formed therein and a horizontally disposed fingerpiece with a forwardly extending lever tab which is freely supported and retained within said lever support and retaining aperture and a plurality of retaining tabs, each of which is freely supported within one of said retaining apertures, whereby said fingerpiece is freely secured within said wall structure and said valve may be opened with minimum actuating force, frangible sprues leading from said inner wall to said fingerpiece whereby said actuator may be molded as a one-piece actuator, said sprues being broken upon first use of said actuator, and said fingerpiece having a discharge passage therein with means on its lower end to connect said passage to the discharge means of said aerosal valve and orifice means on its upper end to provide a desired spray pattern.

12. An actuator for an aerosol valve which comprises a vertically disposed outer tubular wall structure with means on its lower end for affixation to said aerosol valve, said structure having a downwardly facing lever support surface concealed therein and a horizontally disposed fingerpiece with a forwardly extending lever tab which extends beneath said surface and pivots about said support surface, whereby said valve may be opened with minimum actuating force, said fingerpiece having a vertically disposed discharge passage therein with means on its lower end to connect said passage to the discharge means of said aerosol valve and orifice means on its upper end to provide a desired spray pattern.

13. The actuator of claim 12 wherein said orifice means is horizontally disposed to effect a horizontal spray pattern.

14. The actuator of claim 12 wherein said orifice means is angularly disposed to effect an angular spray pattern.

15. An actuator for an aerosol valve which comprises a vertically disposed outer tubular wall structure having an outer wall and an inner wall substantially concentric thereto with an annular bridge connecting said outer and inner walls, said inner wall having means on its lower end for affixation to said aerosol valve, said structure having a lever support surface and a horizontally disposed fingerpiece with a forwardly extending lever tab which pivots about said support surface, whereby said valve may be opened with minimum actuating force, said fingerpiece having a vertically disposed discharge passage therein with means on its lower end to connect said passage to the discharge means of said aerosol valve and orifice means on its upper end to provide a desired spray pattern.

References Cited by the Examiner

UNITED STATES PATENTS

| | | | |
|---|---|---|---|
| 3,180,531 | 4/1965 | Beard et al. | 222—182 |
| 3,185,349 | 5/1965 | Sagarin | 222—182 X |

M. HENSON WOOD, Jr., *Primary Examiner.*

A. N. KNOWLES, *Assistant Examiner.*